United States Patent

Turbessi et al.

[11] Patent Number: 5,755,005
[45] Date of Patent: May 26, 1998

[54] WIPER ASSEMBLY ATTACHMENT MECHANISM

[76] Inventors: Timothy Turbessi; Jim Galloway, both of 51 Maxwell Rd., Rydol, Ga. 30171

[21] Appl. No.: 787,633

[22] Filed: Jan. 23, 1997

[51] Int. Cl.[6] .................................................. B60S 1/32
[52] U.S. Cl. .............................. 15/250.34; 15/250.352; 403/322
[58] Field of Search ................... 15/250.34, 250.31, 15/250.351, 250.3, 250.352; 403/321, 322, 325, 329

[56] References Cited

U.S. PATENT DOCUMENTS

| | | | |
|---|---|---|---|
| 490,709 | 1/1893 | Froehlich | 24/637 |
| 2,420,060 | 5/1947 | Adams | 24/501 |
| 2,507,511 | 5/1950 | Freidag et al. | 292/19 |
| 2,688,173 | 9/1954 | Van Peet | 24/634 |
| 2,896,287 | 7/1959 | Stultz | 403/322 |
| 3,041,093 | 6/1962 | Bonfiglio | 15/250.34 |
| 3,058,143 | 10/1962 | Bock et al. | 15/250.34 |
| 4,027,354 | 6/1977 | Burpee | 15/250.3 |
| 4,529,242 | 7/1985 | Watanabe et al. | 296/78.1 |
| 4,958,405 | 9/1990 | Kuhbauch | 15/250.33 |
| 5,274,876 | 1/1994 | Wehrspann | 15/250.17 |

FOREIGN PATENT DOCUMENTS 898756  7/1944  France ....................... 15/250.34

*Primary Examiner*—Gary K. Graham
*Attorney, Agent, or Firm*—Joseph N. Breaux

[57] ABSTRACT

A windshield wiper attachment mechanism including a drive shaft having a plurality of shaft key-ways formed into a shaft end thereof; at least one locking bar ledge provided on the drive shaft; a wiper holding arm including a shaft receiving cavity having a like plurality of companionate wiper key-ways provided along the interior circumferential surface thereof defining the shaft receiving cavity; and at least one locking bar moveably attached to the wiper holding arm and resiliently biased in a manner such that the locking bar is resiliently positioned into locking contact with the locking bar ledge when the shaft end of the drive shaft positioned within the shaft receiving cavity of the wiper holding arm.

2 Claims, 2 Drawing Sheets

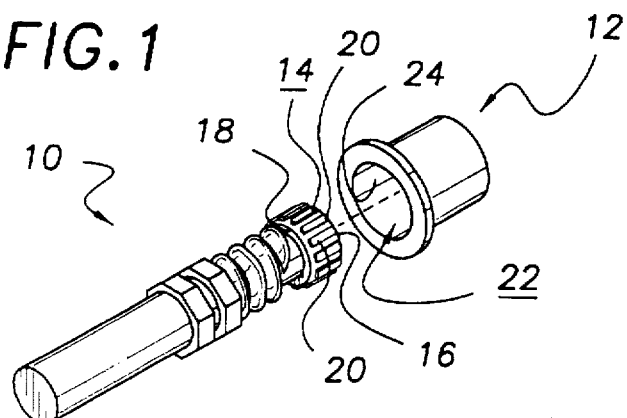
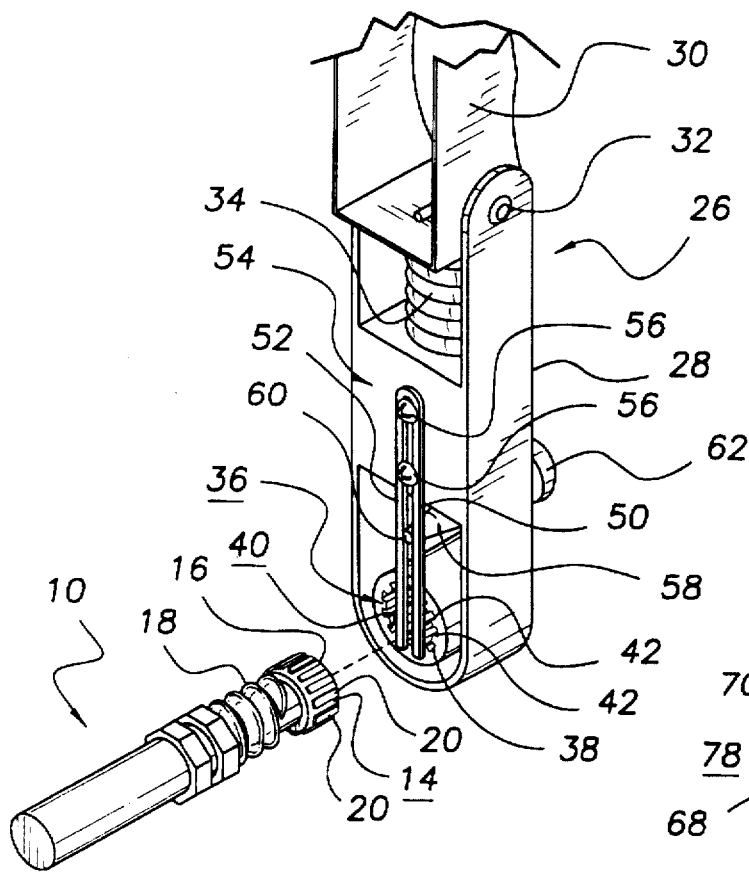
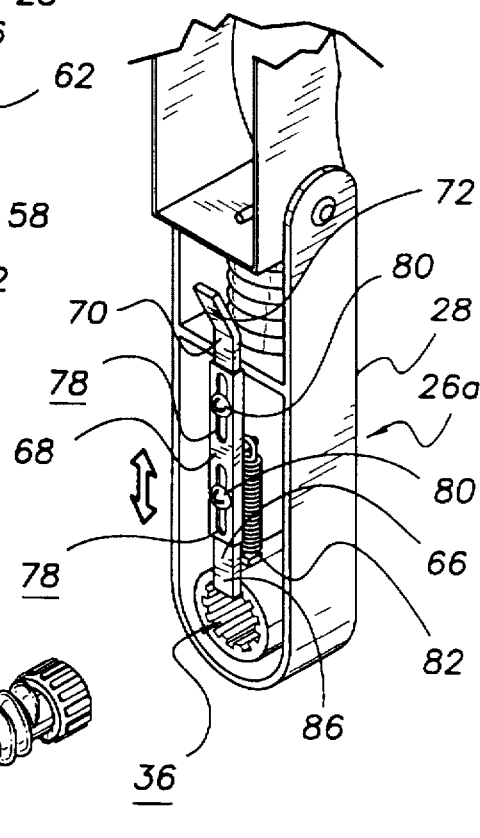

WIPER ASSEMBLY ATTACHMENT MECHANISM

TECHNICAL FIELD

The present invention relates to attachment mechanisms for windshield wipers and more particularly to an attachment mechanism for windshield wipers that includes a plurality of shaft key-ways formed into a shaft end of the drive shaft of a wiper drive assembly; at least one locking bar ledge provided on the drive shaft of the wiper drive assembly; a wiper holding arm including a shaft receiving cavity having a like plurality of companionate wiper key-ways provided along the interior circumferential surface thereof; and at least one locking bar moveably attached to the wiper holding arm and resiliently biased in a manner such that the locking bar is resiliently positioned into locking contact with the locking bar ledge when the shaft end of the drive shaft is positioned within the shaft receiving cavity of the wiper holding arm.

BACKGROUND OF THE INVENTION

Although windshield wipers are necessary while driving a vehicle with a windshield in the rain or snow, the windshield wiper assemblies can reduce the visibility of the driver of the vehicle and reduce the esthetic appearance of the vehicle when not in use. It would be desirable, therefore, to have a windshield wiper holding arm that could be removed from the vehicle when there is little chance of rain to improve the visibility through the vehicle windshield. It would be further desirable to have a windshield wiper holding arm that was easily and quickly removed from the wiper drive shaft for storage out of the way when not needed and rapidly installed onto the wiper drive shaft when needed.

SUMMARY OF THE INVENTION

It is thus an object of the invention to provide a wiper assembly attachment mechanism that includes a windshield wiper holding arm that can be removed from the vehicle.

It is a further object of the invention to provide a wiper assembly attachment mechanism that includes a windshield wiper holding arm that is easily and quickly removed from the wiper drive shaft and rapidly installed onto the wiper drive shaft when needed.

It is a still further object of the invention to provide a wiper assembly attachment mechanism that includes a plurality of shaft key-ways formed into a shaft end of the drive shaft of a wiper drive assembly; at least one locking bar ledge provided on the drive shaft of the wiper drive assembly; a wiper holding arm including a shaft receiving cavity having a like plurality of companionate wiper key-ways provided along the interior circumferential surface thereof; and at least one locking bar moveably attached to the wiper holding arm and resiliently biased in a manner such that the locking bar is resiliently positioned into locking contact with the locking bar ledge when the shaft end of the drive shaft is positioned within the shaft receiving cavity of the wiper holding arm.

It is a still further object of the invention to provide a wiper assembly attachment mechanism that all or some of the above objects in combination.

Accordingly, an attachment mechanism for windshield wipers is provided. The windshield wiper attachment mechanism includes a drive shaft having a plurality of shaft key-ways formed into a shaft end thereof; at least one locking bar ledge provided on the drive shaft; a wiper holding arm including a shaft receiving cavity having a like plurality of companionate wiper key-ways provided along the interior circumferential surface thereof defining the shaft receiving cavity; and at least one locking bar moveably attached to the wiper holding arm and resiliently biased in a manner such that the locking bar is resiliently positioned into locking contact with the locking bar ledge when the shaft end of the drive shaft is positioned within the shaft receiving cavity of the wiper holding arm. The term "moveably attached" is used herein to mean attached in a manner such that at least a portion of the locking bar is moveable relative to the wiper holding arm. In a preferred embodiment the locking bar a slidably entrapped by a guide mechanism in a manner such that the locking bar is restricted to moving back and forth along a straight line path a portion of which is over the shaft receiving cavity. In another preferred embodiment two resilient metal locking bars are provided by bending a length of resilient metal into an elongate U-shape. The two locking bars thus created are each resiliently biased toward the other and positioned with respect to the shaft receiving cavity in a manner such that they resiliently return to a position at least partially covering the shaft receiving cavity. When this embodiment is used it is preferred to further provide the wiper holding arm with a cone shaped locking bar separator button for forcing the two resilient locking bars apart a sufficient distance to allow insertion and removal of the shaft end.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 is a perspective view of the drive shaft of the wiper assembly attachment mechanism of the present invention showing the shaft key-ways formed into the shaft end thereof, the circumferential locking bar ledge, and an optional drive shaft cover cap provided for covering the shaft end when the wiper holding arm is detached and stored out of the way.

FIG. 2 is a perspective view showing the drive shaft of FIG. 1 exploded away from a first exemplary embodiment of the wiper holding arm of the wiper assembly attachment mechanism of the present invention showing the lower holding arm assembly including the shaft receiving cavity, the companionate wiper key-ways provided along the interior circumferential surface of the shaft receiving cavity, the two resilient metal locking bars formed from a single length of spring steel into an elongate U-shape, and the cone shaped locking bar separator button.

FIG. 3 is a perspective view showing the drive shaft of FIG. 1 exploded away from a second exemplary embodiment of the wiper holding arm of the wiper assembly attachment mechanism of the present invention showing the lower holding arm assembly including the shaft receiving cavity, the companionate wiper key-ways provided along the interior circumferential surface of the shaft receiving cavity, and the slide mounted locking bar slidably entrapped by the guide mechanism and biased toward the shaft receiving cavity by the tension spring.

DESCRIPTION OF THE EXEMPLARY EMBODIMENT

Figure 4:
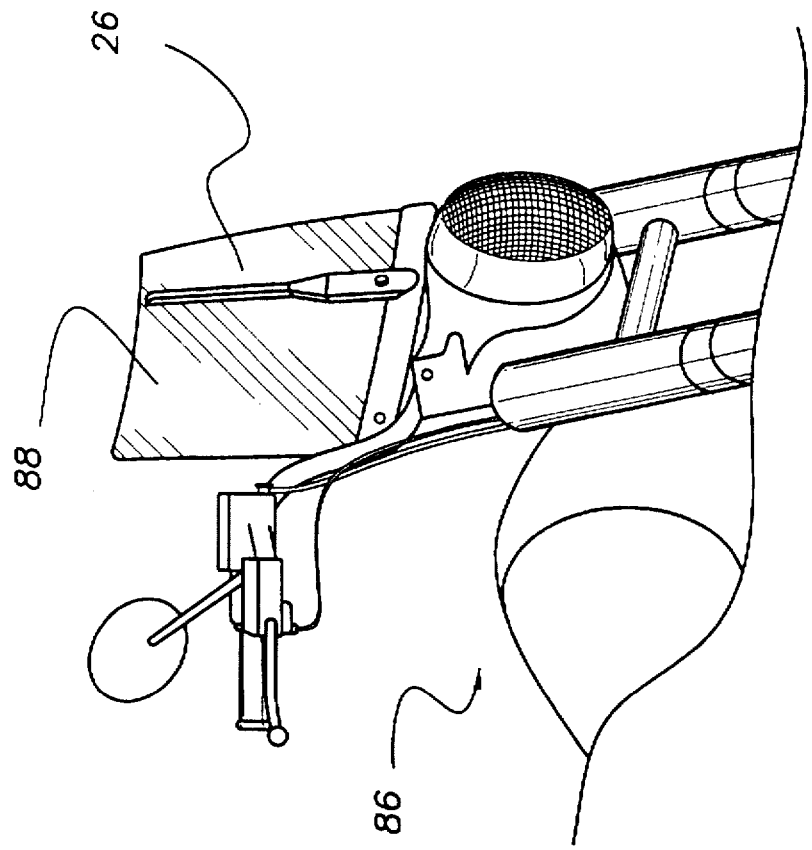
FIG. 4 is a partial perspective view of a representative motorcycle showing a representative windshield with the drive shaft cover cap covering the shaft end of the drive shaft.

FIG. 1 shows an exemplary embodiment of the drive shaft of the wiper assembly attachment mechanism of the present invention, generally designated by the numeral 10, and an exemplary embodiment of the drive shaft cover cap, generally designated by the numeral 12. In this embodiment, drive shaft 10 is constructed from a section of stainless steel rod material that has been machined to form a number of parallel oriented shaft key-ways 14 into a shaft end 16 thereof and a circumferential locking bar ledge 18 immediately adjacent to shaft key-ways 14 in a manner such that parallel oriented shaft key-ways 14 are positioned between shaft end 16 and circumferential locking bar ledge 18. Each shaft key-way 14 is partially defined between a pair of adjacent raise shaft keys 20.

Drive shaft cover cap 12 is molded from plastic and is provided with a cover cap cavity 22 sized to receive therein shaft end 16 of drive shaft 10 in a manner such that cover cap interior wall 24 frictionally grips drive shaft 10 and maintains cover cap 12 in place covering shaft end 16. Cover cap 12 is used to cover shaft end 16 when the wiper holding arm is detached and stored out of the way.

FIG. 2 shows a first exemplary embodiment of a wiper holding arm of the wiper assembly attachment mechanism 10 of the present invention, generally designated by the numeral 26, with drive shaft 10 exploded away from a lower holding arm assembly 28 thereof. Lower holding arm assembly 28 is pivotally attached to a conventional upper wiper holding arm 30 in the conventional manner with a pivot pin 32 and an upper arm biasing spring 34. Upper arm biasing spring 34 biases upper arm 30 toward the windshield surface and presses the wiper blade against the windshield.

Lower holding arm assembly 28 includes a shaft receiving cavity 36 that is defined by an interior circumferential surface 38. A companionate number of wiper key-ways 40 are provided along interior circumferential surface 38 of shaft receiving cavity 36. Wiper key-ways 40 are each defined between a pair of cavity keys 42. Cavity key-ways 40 are sized to receive shaft keys 20 and cavity keys 42 are sized to fit within shaft key-ways 14 in a manner such that when shaft end 16 is inserted into shaft receiving cavity 36 shaft end 16 is prevented from rotating with respect to shaft receiving cavity 36.

In this embodiment, wiper arm attachment mechanism 10 includes two resilient metal locking bars 50,52 that are formed from a single length of spring steel into an elongate U-shaped member, generally designated by the numeral 54. U-shaped member 54 is secured to lower holding arm assembly 28 by two securing screws 56 in a manner such that locking bars 50,52 each have a portion partially covering shaft receiving cavity 36. A cone shaped metal locking bar separator button 58 is slidably installed within lower holding arm assembly 28 in a manner such that a separator portion 60 is positioned and maintained between locking bars 50,52. Separator portion 60 is used to separate locking bars 50,52 sufficiently to allow insertion of shaft end 16 into shaft receiving cavity 36. Locking bars 50,52 are separated by pressing down on an externally positioned button end 62 thereof. When button end 62 is released, locking bars 50,52 engage locking bar ledge 18 and maintain lower holding arm assembly 28 in connection with drive shaft 10. Lower holding arm assembly 28 is disconnected from drive shaft 10 by depressing button end 62 while pulling lower holding arm assembly 28 free.

FIG. 3 shows a second exemplary embodiment of wiper holding arm, generally designated by the designation 26a.

Wiper holding arm 26a is identical to wiper holding arm 26 except that wiper holding arm 26a includes a single locking bar 66. In this embodiment, locking bar 66 is slidably mounted to lower holding arm assembly 28 by a guide mechanism 68 that guides and restricts the movement of locking bar 66 to a straight line path. Locking bar 66 is a length of rectangular cross section stainless steel bar stock that has been bent at a first end 70 to provide a grasping tab 72. Guide mechanism 68 has a rectangular cross sectional channel sized to allow locking bar 66 to slide there along. A pair of elongated and collinear pin stop apertures 78 are provided through guide mechanism 68. A pair of stop pins 80 extend through pin stop apertures 78 and are in rigid connection with locking bar 66. A helical, biasing spring 82 is connected between locking bar 66 and lower holding arm assembly 28 in a manner to bias locking bar 66 toward shaft receiving cavity 36 in a manner such that a second locking bar end 86 is positioned over, partially blocking shaft receiving cavity 36. In use, locking bar 66 is pulled back by engaging grasping tab 72 and urging second locking bar end 86 away from shaft receiving cavity 36 a distance sufficient to insert first shaft end 16 therein and to disengage wiper holding arm 26a when desired.

Figure 5:
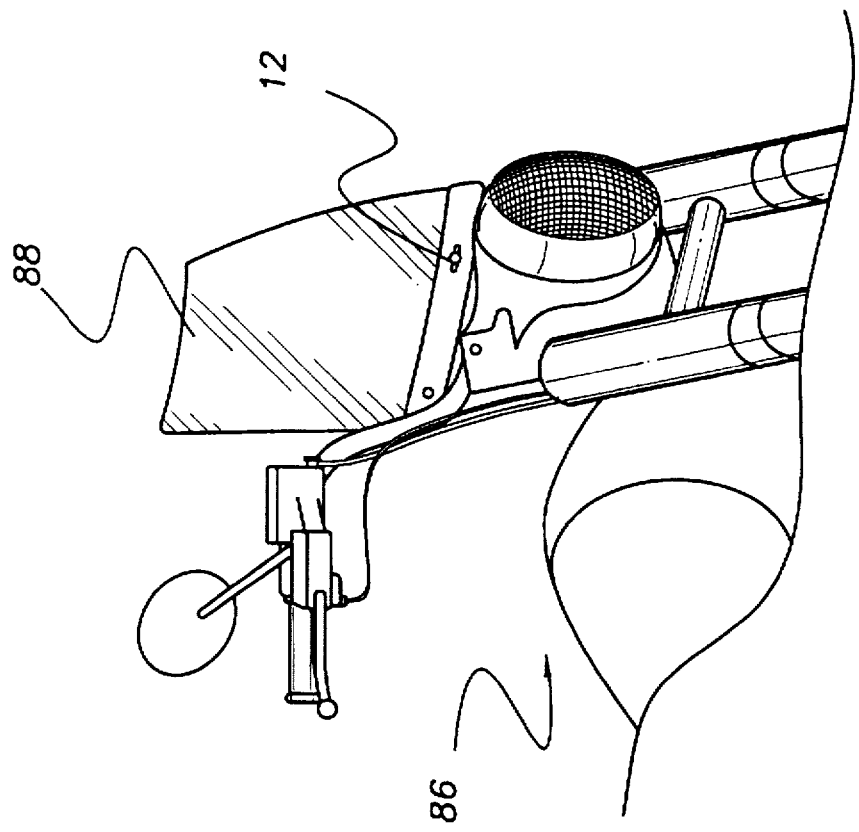
FIG. 5 is a partial perspective view of the representative motorcycle showing the representative windshield with the lower holding arm assembly secured to the drive shaft.

FIG. 4 shows a representative motorcycle 86 having a representative windshield 88 with a windshield wiper system having the first exemplary wiper attachment mechanism installed. In this view, wiper holding arm 26 is removed and drive shaft cover cap 12 positioned over shaft end 16 of drive shaft 10. FIG. 5 shows motorcycle 86 with wiper holding arm 26 connected to drive shaft 10.

It can be seen from the preceding description that a wiper assembly attachment mechanism has been provided that includes a windshield wiper holding arm that can be removed from the vehicle; that includes a windshield wiper holding arm that is easily and quickly removed from the wiper drive shaft and rapidly installed onto the wiper drive shaft when needed; and that includes a plurality of shaft key-ways formed into a shaft end of the drive shaft of a wiper drive assembly; at least one locking bar ledge provided on the drive shaft of the wiper drive assembly; a wiper holding arm including a shaft receiving cavity having a like plurality of companionate wiper key-ways provided along the interior circumferential surface thereof; and at least one locking bar moveably attached to the wiper holding arm and resiliently biased in a manner such that the locking bar is resiliently positioned into locking contact with the locking bar ledge when the shaft end of the drive shaft is positioned within the shaft receiving cavity of the wiper holding arm.

It is noted that the embodiment of the wiper assembly attachment mechanism described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A wiper assembly attachment mechanism comprising:
   a drive shaft having a plurality of shaft key-ways formed into a shaft end thereof;
   at least one locking bar ledge provided on said drive shaft;
   a wiper holding arm including a shaft receiving cavity having a like plurality of companionate wiper key-ways provided along an interior circumferential surface thereof defining said shaft receiving cavity;

two lock bars moveably attached to said wiper holding arm and resiliently biased in a manner such that said two locking bars are resiliently positioned into locking contact with said locking bar ledge when said shaft end of said drive shaft is positioned within said shaft receiving cavity of said wiper holding arm, said two resilient metal locking bars being formed by bending a single length of resilient metal into an elongate U-shaped member, said two locking bars each being resiliently biased toward each other and positioned with respect to said shaft receiving cavity in a manner such that each of said two locking bars resiliently return to a position at least partially covering said shaft receiving cavity, said U-shaped member being secured to a lower holding arm assembly of said wiper holding arm by two securing screws in a manner such that said two locking bars each have a portion partially covering said shaft receiving cavity; and a locking bar separator button having a separator portion moveable between said two locking bars in a manner to force said two locking bars into a position allowing insertion and removal of said shaft end, said locking bar separator button being cone shaped and slidably installed within said lower holding arm assembly in a manner such that said separator portion is positioned and maintained between said two locking bars.

2. The wiper assembly attachment mechanism of claim 1, wherein:

said locking bar separator button includes a button end positioned externally of said lower holding arm.

* * * * *